United States Patent [19]
Kim

[11] Patent Number: 6,132,572
[45] Date of Patent: Oct. 17, 2000

[54] APPARATUS AND METHOD OF PRODUCING WATER FOR DEODORIZATION AND CLEANING APPLICATIONS

[75] Inventor: Hee Jeong Kim, Seoul, Rep. of Korea

[73] Assignee: Kyungwon Enterprise Co., Ltd., Seoul, Rep. of Korea

[21] Appl. No.: 09/154,833

[22] Filed: Sep. 17, 1998

[51] Int. Cl.[7] .................................................. C02F 1/461
[52] U.S. Cl. .......................... 204/253; 204/257; 204/269
[58] Field of Search .................................. 205/746, 748; 204/253, 257, 269

[56] References Cited

U.S. PATENT DOCUMENTS 5,340,458  8/1994  Koizumi .................................. 204/257
5,474,662  12/1995  Miyamae ................................. 204/257

*Primary Examiner*—Arun S. Phasge

[57] ABSTRACT

An apparatus and method of producing water for deodorization and cleaning applications is disclosed. In the apparatus or an electrolyzer, anode and cathode units are alternately arranged and are separated from each other by ion exchange membranes, and individually form a unit cell. Two end plates are attached to both ends of the electrolyzer. The inlet end plate has two water inlets, while the outlet end plate has two water outlets. In an electroanalysis of water in the apparatus, the current for the apparatus is set to a level of not higher than 100 A, while the voltage for the apparatus is set to a level of not higher than 100 V. In addition, the finally processed water of this invention has an acidity (pH) ranged from 2.0 to 12 and an oxidation/reduction electric potential ranged from −900 to +1180.

6 Claims, 3 Drawing Sheets

APPARATUS AND METHOD OF PRODUCING WATER FOR DEODORIZATION AND CLEANING APPLICATIONS

BACKGROUND OF THE INVENTION

1. Field of the Invention

The present invention relates, in general, to an apparatus and method of producing water for deodorization and cleaning applications and, more particularly, to an apparatus and method of producing such water through an electroanalysis capable of producing acidic and alkaline water, the acidic and alkaline water respectively having oxidizing power and reducing power, thus being effectively used for deodorizing and cleaning contaminants.

2. Description of the Prior Art

In the prior art, deodorization is accomplished by several methods: chemical methods, physical methods and biological methods. The chemical methods for deodorization use acids-alkalis, oxidizing-reducing agents and ion exchange reactions. The physical methods for deodorization are performed with active carbons, zeolite, silica gel or surface active agents capable of deodorizing due to an absorption power of their perforated surfaces. The biological methods for deodorization are performed with enzymes or bacteria. However, such chemical or physical methods for deodorization are problematic in that they gather foul-smelling gases from a gas source prior to chemically washing and deodorizing the gases or physically deodorizing the gases using absorption towers, thus needing large-sized and expensive equipment. Particularly, the above chemical deodorizing methods, using large-sized equipment and expensive chemicals, such as oxidizing-reducing agents and acidic, alkaline solution, are apt to cause a secondary environmental pollution due to such chemicals. In the physical deodorizing methods needing large-sized absorption towers, the absorption agent inside each tower is finally saturated with contaminants. It is thus necessary to remove the saturated contaminants from the absorption towers through a separate process while causing a secondary environmental pollution due to the contaminants.

When a surface active agent is used for washing off or removing contaminants or dirt, the surface active agent may result in water pollution. Solvent may be used for washing off or removing contaminants or dirt. However, such solvent may cause a harmful environment and/or a fire in working places.

SUMMARY OF THE INVENTION

Accordingly, the present invention has been made keeping in mind the above problems occurring in the prior art, and an object of the present invention is to provide an apparatus and method of producing water for deodorization and cleaning applications, which effectively produces such water through an electroanalysis capable of producing acidic and alkaline water, the acidic and alkaline water respectively having oxidizing power and reducing power, thus being effectively used for deodorizing and cleaning contaminants.

In order to accomplish the above object, the present invention provides an apparatus for producing water for deodorization and cleaning applications, comprising: an electrolyzer. In the above electrolyzer, a plurality of anode and cathode units are alternately arranged while being brought into close contact with each other. The anode and cathode units are separated from each other by a plurality of ion exchange membranes and individually form a unit cell. Two end plates: inlet and outlet end plates are attached to both ends of the electrolyzer. The inlet end plate has two water inlets, while the outlet end plate has two water outlets.

In an electroanalysis of water in the above apparatus, the current for the apparatus is set to a level of not higher than 100 A, while the voltage for the apparatus is set to a level of not higher than 100 V. In addition, the finally processed water of this invention has an acidity (pH) ranged from 2.0 to 12 and an oxidation/reduction electric potential ranged from −900 to +1180.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
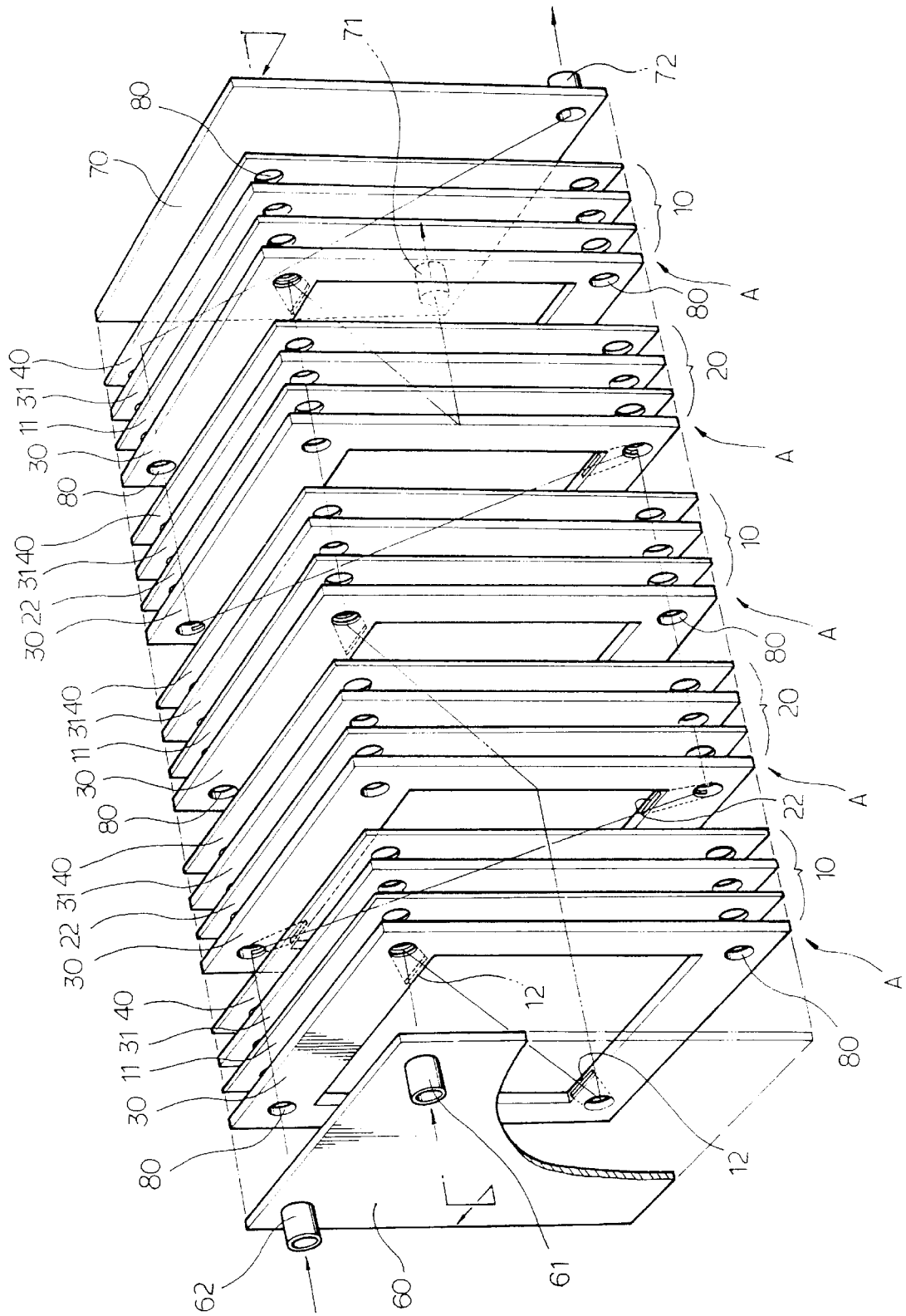
FIG. 1 is an exploded perspective view of an electrolyzer of the apparatus for producing water used for deodorization and cleaning applications in accordance with the preferred embodiment of the present invention.
Figure 2:
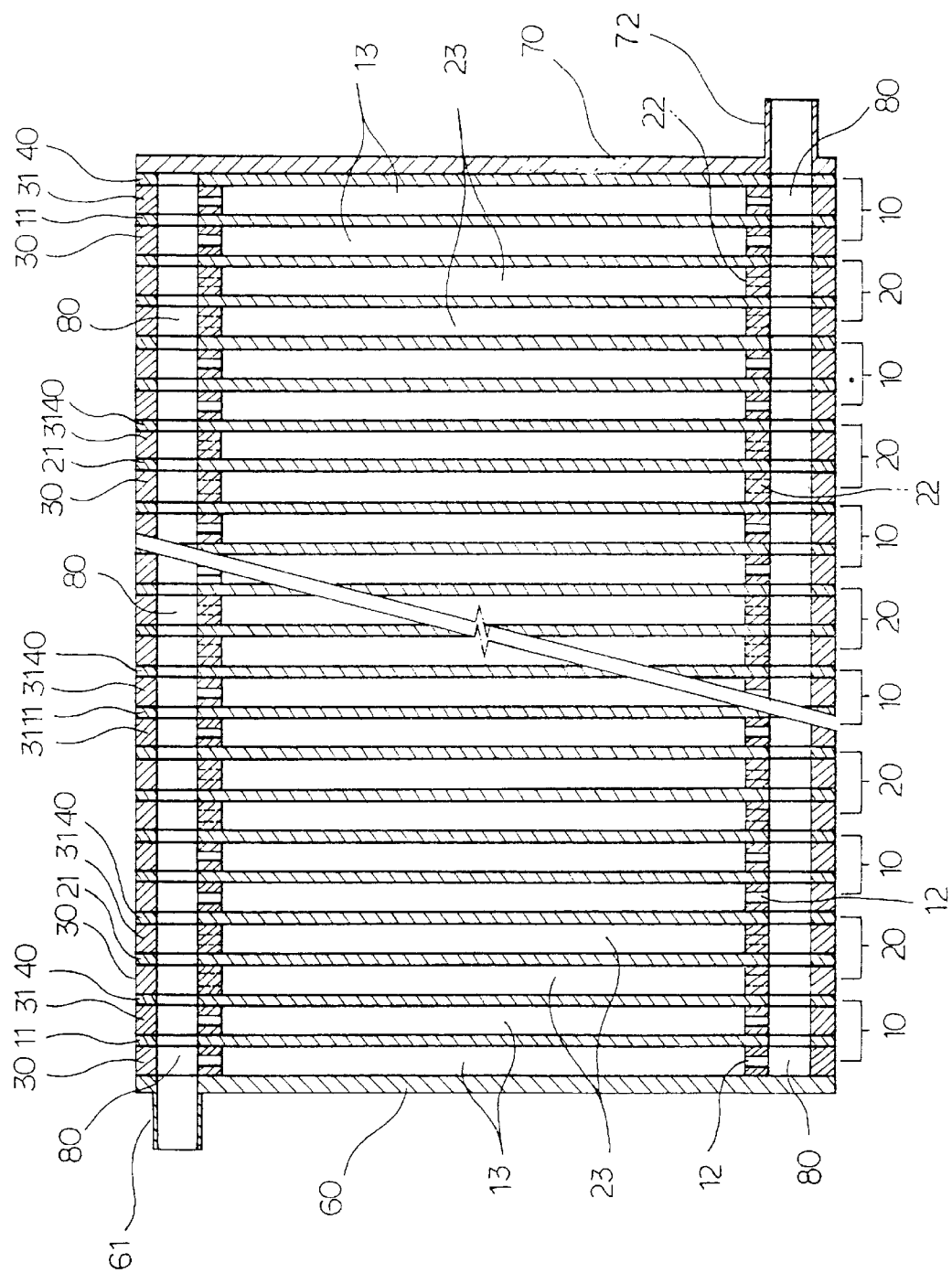
FIG. 2 is a longitudinal sectioned view of the electrolyzer of FIG. 1, with the parts of the analyzer being assembled into a single body.

FIG. 1 is an exploded perspective view of an electrolyzer included in an apparatus for producing water used for deodorization and cleaning applications in accordance with the preferred embodiment of this invention. FIG. 2 is a longitudinal sectioned view of the analyzer of FIG. 1, with the parts of the analyzer being assembled into a single body.

Figure 3:
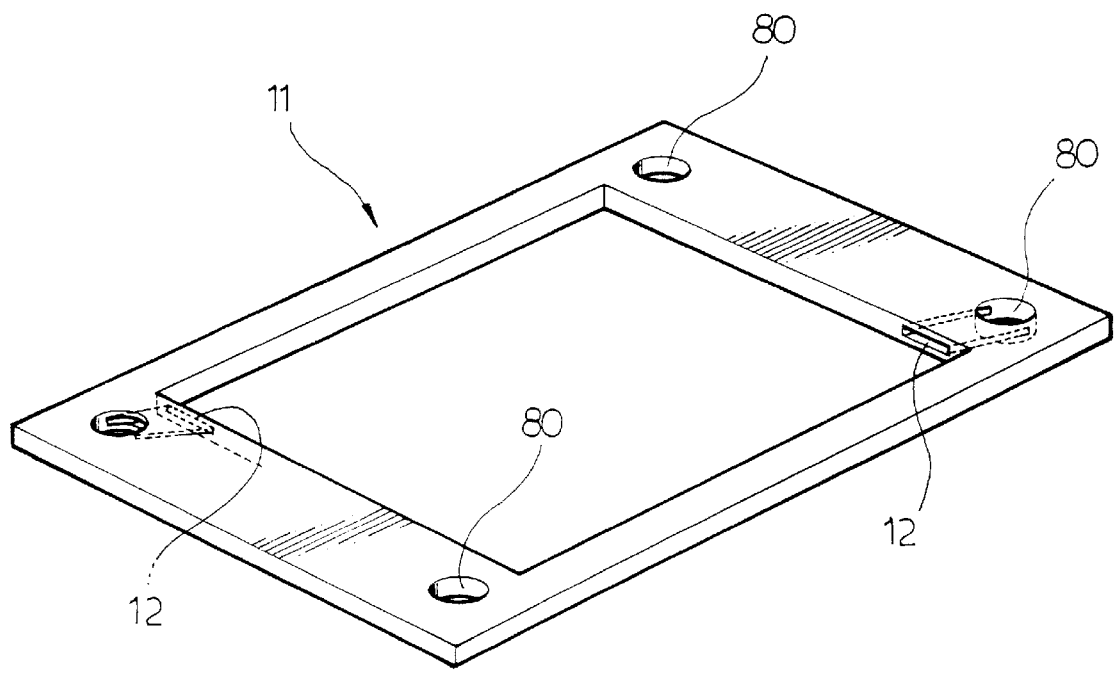
FIG. 3 is a perspective view showing the structure of a gasket included in the analyzer of this invention.

FIG. 3 is a perspective view showing the structure of a gasket included in the analyzer of this invention.

As shown in the drawings, the apparatus of this invention comprises an electrolyzer with two types of units: a plurality of anode and cathode units 10 and 20 alternately arranged in the electrolyzer. The two types of units 10 and 20 are separated from each other by a plurality of membranes or ion exchange membranes capable of isolating the cathodes from the anodes. That is, the anode and cathode units 10 and 20, individually forming a unit cell A, are alternately arranged while being brought into close contact with each other. An inlet end plate 60, having two water inlets 61 and 62, is attached to one end of the electrolyzer, while an outlet end plate 70, having two water outlets 71 and 72, is attached to the other end of the electrolyzer.

As described above, the inlet end plate 60 has two water inlets 61 and 62, while the outlet end plate 70 has two water outlets 71 and 72. In the operation of the apparatus, water, introduced into the anode units 10 through the first inlet 61, becomes acidic water prior to being discharged from the apparatus through the first outlet 71. Meanwhile, water, introduced into the cathode units 20 through the second inlet 62, becomes alkaline water prior to being discharged from the apparatus through the second outlet 72.

Each of the anode units 10 forms a unit cell "A" which comprises an anode plate 11 sided with two gaskets: a gap adjusting gasket 30 and an electrolyte leakage prevention gasket 31, at its both sides. In the same manner, each of the cathode units 20 forms a unit cell "A" which comprises a cathode plate 21 sided with two gaskets: a gap adjusting gasket 30 and an electrolyte leakage prevention gasket 31, at its both sides. Each of the two types of gaskets 30 and 31 has an opening at its center portion. In each gasket 30, 31 associated with each anode plate 11, two passages 12 are formed on the edge of the opening at diagonally opposite positions, thus communicating with an anode reaction chamber 13 defined between each anode plate 11 and each gasket 30, 31. In the same manner, in each gasket 30, 31 associated with each cathode plate 21, two passages 22 are formed on the edge of the opening at diagonally opposite positions, thus communicating with a cathode reaction chamber 23 defined between each cathode plate 21 and each gasket 30, 31.

Each of the plates 11 and 21 is holed at its four corners at positions corresponding to the inlets 61 and 62 and the outlets 71 and 72 of the two end plates 60 and 70, thus having four holes 80 at the four corners. In the same manner, each of the gaskets 30 and 31 has four holes 80 at positions corresponding to the four holes 80 of each plate 11, 21. The holes 80, provided on the plates 11 and 21 and the gaskets 30 and 31, form passages for water introduced into the electrolyzer through the inlets 61 and 62 of the inlet end plate 60. As described above, two diagonally opposite passages 12 are formed on the edge of the opening of each gasket 30, 31 associated with each anode plate 11 so as to communicate with both the first inlet 61 and the anode reaction chamber 13. Two diagonally opposite passages 22 are formed on the edge of the opening of each gasket 30, 31 associated with each cathode plate 21. The two passages 22 communicate with both the second inlet 62 and the cathode reaction chamber 23. Therefore, water, introduced into the electrolyzer through the first inlet 61, flows through the holes 80 of the anode units 10 prior to being introduced into the anode reaction chambers 13 through the passages 12 of said units 10. However, since there is no passage 12 communicating with the second inlet 62, water, introduced into the electrolyzer through the second inlet 62, passes through the holes 80 of the anode units 10 without being introduced into the anode reaction chambers 13. Water, introduced into the electrolyzer through the second inlet 62, thus reaches each cathode unit cell "A" or each cathode unit 20 where the water is introduced into the cathode reaction chamber 23 through the passages 22 formed on the gaskets 30 and 31 of each cathode unit 20. In a brief description, water, introduced into the first anode unit 10, exclusively flows into the two anode reaction chambers 13 of said anode unit 10, thus being reacted in said reaction chambers 13. Thereafter, the water flows from the first anode unit 10 into the second anode unit 10 through the hole 80 of said second anode unit 10. Such a process is repeated until acidic water is discharged from the electrolyzer through the first outlet 71. Meanwhile, water, introduced into the first cathode unit 20, exclusively flows into the two cathode reaction chambers 23 of said cathode unit 20, thus being reacted in said reaction chambers 23 prior to flowing into the second cathode unit 20 through the hole 80 of said second cathode unit 20. Such a process is repeated until alkaline water is discharged from the electrolyzer through the second outlet 72.

In a detailed description, water, introduced into the electrolyzer through the first inlet 61, primarily flows through the hole 80 of the first anode unit 10. The water is, thereafter, introduced into the two anode reaction chambers 13 of said first anode unit 10 through the upper passages 12 formed on the two gaskets 30 and 31 of the first anode unit 10. In the first anode unit 10, the water flows down while coming into contact with the anode plate 11 so that the water is electrolyzed. The water thus loses electrons and becomes primary acidic water. Thereafter, the primary acidic water is discharged from the first anode unit 10 through the lower passages 12 of said unit 10 prior to passing through the hole 80 of the first cathode unit 20. When the water reaches the hole 80 of the second anode unit 10, the water is introduced into the two anode reaction chambers 13 of said second anode unit 10 through the lower passages 12 formed on the two gaskets 30 and 31 of the second anode unit 10. In the second anode unit 10, the water flows upwardly while coming into contact with the anode plate 11 of said unit 10 so that the water is further electrolyzed. The water thus further loses electrons and becomes more powerful acidic water. The above process is repeated in the next anode units 10 until final acidic water is discharged from the electrolyzer through the first outlet 71.

On the other hand, water, introduced into the electrolyzer through the second inlet 62, passes through the hole 80 of the first anode unit 10. The water reaches the first cathode unit 20 where the water is introduced into the two cathode reaction chambers 23 of said first cathode unit 20 through the upper passages 22 formed on the two gaskets 30 and 31 of the first cathode unit 20. In the first cathode unit 20, the water flows down while coming into contact with the cathode plate 21 so that the water is electrolyzed. The water thus receives a lot of electrons and becomes primary alkaline water. The primary alkaline water is, thereafter, discharged from the first cathode unit 20 through the lower passages 22 of said unit 20 prior to passing through the hole 80 of the second anode unit 10. When the water reaches the hole 80 of the second cathode unit 20, the water is introduced into the two cathode reaction chambers 23 of said second cathode unit 20 through the lower passages 22 formed on the two gaskets 30 and 31 of the second cathode unit 20. In the second cathode unit 20, the water flows upwardly while coming into contact with the cathode plate 21 of said unit 20 so that the water is further electrolyzed. The water thus further receives electrons and becomes more powerful alkaline water. The above process is repeated in the next cathode units 20 until final alkaline water is discharged from the electrolyzer through the second outlet 72.

That is, water, introduced into the electrolyzer through the first inlet 61, only flows into the anode reaction chambers 13 of the anode units 10 in the order of the first to last chambers 13, thus being repeatedly electrolyzed or losing electrons to become acidic water. Meanwhile, water, introduced into the electrolyzer through the second inlet 62, only flows into the cathode reaction chambers 23 in the order of the first to last chambers 23, thus being repeatedly electrolyzed or receiving electrons to become alkaline water. The finally electrolyzed acidic water is discharged from the electrolyzer through the first outlet 71 of the outlet end plate 70, while the finally electrolyzed alkaline water is discharged from the electrolyzer through the second outlet 72 of said plate 70.

In the above operation, water in each anode unit 10 is processed through an oxidation reaction that generates oxygen ions, hydrogen ions and oxygen radicals, thus allowing the water to become acidic water. Such an oxidation reaction for water in each anode unit 10 is expressed by the following chemical formula (1).

$$H_2O \rightarrow \frac{1}{2}O_2 + 4H^+ + O. + 4e^{31} \tag{1}$$

On the other hand, water in each cathode unit 20 is processed through a reduction reaction that generates hydrogen ions, alkali ions and hydrogen radicals, thus allowing the water to become alkaline water. Such a reduction reaction for water in each cathode unit 20 is expressed by the following chemical formula (2).

$$2H_2O+2e^- \rightarrow \tfrac{1}{2}H_2+2OH^-+H. \qquad (2)$$

Electroanalysis of water in an electrolyzer with anodes and cathodes for production of acidic and alkaline water is well known to those skilled in the art.

The present invention provides an apparatus for effectively producing powerful water for deodorization and cleaning applications. The apparatus uses anodes and cathodes and effectively produces acidic and alkaline water.

In order to allow the oxidation and reduction reactions expressed by the chemical formulas (1) and (2) to be smoothly performed in the electrolyzer, each of the anode and cathode plates 11 and 21 uses an appropriate catalyst.

In the present invention, it is preferable to use a numerical stabilizing anode (DSA), made of a titanium substrate plated with platinum or coated with oxygen generating catalysts or oxides of iridium (Ir) or ruthenium (Ru), as such an anode plate (11). Meanwhile, such a cathode plate (21) is preferably made of a stainless steel, nickel, mild steel or titanium substrate coated with hydrogen generating catalysts or oxides of iridium (Ir) or ruthenium (Ru).

The ion exchange membranes 40 of this invention use ion exchange membranes made of fluorine resins or hydrocarbons. In the present invention, it is necessary to reduce the electrolyzing pressure by using Sn—Ir—Pt composite electrodes having a low hydrogen generating electric potential. The it is preferable to set the thickness of each of the gap adjusting gaskets 30 to a level of not larger than 2 mm while considering the voltage between the anodes and the cathodes.

In the present invention, both the gap adjusting gaskets 30 and the electrolyte leakage prevention gaskets 31 are preferably made of EDPM rubber, silicon or teflon.

The unit cells "A" of this invention are set in a housing frame and are tightly assembled with each other into a single body using nuts and bolts. The anodes and cathodes of the electrolyzer of this invention are electrically connected to the positive and negative terminals of a current supply source, while the outlets for the acidic and alkaline water are respectively provided with sensors for sensing an electric potential during an oxidation or reduction reaction.

Therefore, it is possible to continuously sense the electric potential prior to controlling the electric potential of a rectifier using a controller or controlling the acidity and akality using a flow controller.

In the electrolyzer of this invention, the current is set to a level of not higher than 100 A, while the voltage is set to a level of not higher than 100 V in accordance with the flow rate of water for the electrolyzer. In the operation of the electrolyzer, it is necessary to timely sense the voltage (V) and acidity (pH) prior to measuring the operational conditions of the electrolyzer. It is thus possible to produce high power acidic and alkaline water. The acidity (pH) of the finally processed acidic or alkaline water of this invention is ranged from 2.0 to 14. The oxidative or reducibility of the finally processed water of this invention is expressed by the oxidation/reduction electric potential ranged from −900 to +1180. The finally processed water of this invention is thus effectively used for deodorization and cleaning applications.

The electrolyzer of this invention is provided with depolarized ion exchange membranes 40. The above electrolyzer thus prevents a movement of $H^+$ ions from the anode units 10 into the cathode units 20 and restricts a movement of $OH^-$ ions from the cathode units 20 into the anode units 10, thus maximizing productivity of the acidic and alkaline water. Such ion exchange membranes 40 can be easily obtained from market. That is, it is possible to use ion exchange membranes, made of fluorines or hydrocarbons and produced by Dupon Co. of U.S.A, Asai Chemical Co. or Asai Glass Co. of Japan, or depolarized ion exchange membranes, comprising integrated anion and cation exchange membranes and produced by Dokuyamasoda Co. of Japan, as the ion exchange membranes 40 of this invention. In order to increase electric conductivity of the electrolyzer, salt or vinegar is used as an electrolyte. Such salt or vinegar thus allows water to be easily and effectively electrolyzed at low voltages, thus effectively producing acidic and alkaline water.

A better understanding of the present invention may be obtained in light of following examples and tests which are set forth to illustrate, but are not to be construed to limit, the present invention.

EXAMPLE 1

City water was supplied to the electrolyzer of this invention at a flow rate of 10 l/min while fixing the current for the electrolyzer to 50 A. In such a case, both the voltage and acidity (pH) were timely checked so as to measure the operational conditions of the electrolyzer during an electroanalysis of water for producing acidic and alkaline water. The acidity of the anode units 10 is shown in table 1.

TABLE 1

| the acidity (pH) of anode units according to voltages as time passes | | | |
|---|---|---|---|
| time (min) | current (A) | voltage (V) | acidity (pH) |
| 10 | 50 | 16 | 3.0 |
| 20 | 50 | 15 | 3.1 |
| 30 | 50 | 15 | 3.1 |
| 40 | 50 | 15 | 3.0 |
| 50 | 50 | 15 | 3.0 |

EXAMPLE 2

The process of example 1 was repeated while changing the voltages in accordance with the types of the ion exchange membranes (40). The results are given as shown in table 2.

TABLE 2

| the acidity (pH) of anode units according to voltages as time passes | | | | | |
|---|---|---|---|---|---|
| | | voltage (V) | | anode unit (pH) | |
| time (min) | current (A) | A | B | A | B |
| 10 | 50 | 18 | 32 | 4.0 | 4.5 |
| 20 | 50 | 25 | 30 | 3.7 | 4.1 |
| 30 | 50 | 24 | 28 | 3.6 | 4.2 |
| 40 | 50 | 21 | 28 | 3.5 | 4.2 |
| 50 | 50 | 22 | 28 | 3.5 | 4.2 |

(used ion exchange membranes in this example, membrane A: Nafion of Dupon; membrane B: 2 micron of Pore series)

When comparing the examples 1 and 2 to each other, it is noted that the electrolyzer of this invention more effectively produces acidic water at low voltages.

EXAMPLE 3

The process of example 1 was repeated while adding 0.0001% of salt or vinegar as an electrolyte for increasing electric conductivity during an electroanalysis of water in the electrolyzer. The results are given as shown in table 3.

TABLE 3 the acidity (pH) and voltages of anode units
when using salt or vinegar

|  |  | voltage (V) |  | (PH) |  |
|---|---|---|---|---|---|
| time (min) | current (A) | salt | vinegar | salt | vinegar |
| 10 | 50 | 8 | 7 | 3.0 | 3.1 |
| 20 | 50 | 7 | 8 | 3.1 | 3.0 |
| 30 | 50 | 7 | 7 | 3.1 | 3.1 |
| 40 | 50 | 7 | 8 | 3.0 | 3.2 |
| 50 | 50 | 7 | 7 | 3.0 | 3.1 |

Test 1

Finally processed water of this invention was used for deodorization through a gas detector tube method. The results are given as shown in table 4.

TABLE 4 deodorization power of processed water for
varieties of gases (deodorization power: %,
sample size: 10 ml)

|  |  | time (min) | | | |
|---|---|---|---|---|---|
| test gases | Samples | 5 | 15 | 30 | 60 |
| trimethylamine | Blank | 0 | 23.5 | 29.4 | 41.2 |
|  | city water | 91.2 | 94.1 | 97.1< | 97.1< |
|  | Alamask | 94.1 | 97.1< | 97.1< | 97.1< |
|  | processed water | 97.1< | 97.1< | 97.1< | 97.1< |
| chloroform | Blank | 0 | 6.1 | 14.3 | 24.5 |
|  | city water | 77.6 | 81.6 | 90.8 | 96.9 |
|  | Alamask | 84.7 | 89.8 | 95.9 | 99.0< |
|  | processed water | 91.8 | 94.9 | 99.0< | 99.0< |
| acetaldehyde | Blank | 0 | 5.3 | 10.5 | 21.1 |
|  | city water | 52.6 | 57.9 | 68.4 | 78.9 |
|  | Alamask | 63.2 | 65.5 | 78.9 | 84.2 |
|  | processed water | 73.7 | 80.0 | 89.5 | 95.8 |
| methyl-mercaptan | Blank | 0 | 3.6 | 8.2 | 12.7 |
|  | city water | 67.3 | 70.9 | 80.0 | 87.3 |
|  | Alamask | 78.2 | 81.8 | 89.1 | 96.4 |
|  | processed water | 83.6 | 87.3 | 92.7 | 98.2< |

Deodorization power (%) = [(Cb − Cs)/Cb] × 100, where
Cb: concentration checked after 5 minutes of Blank
Cs: concentration of samples Test 2

Finally processed water of this invention was used for deodorization. The results are given as shown in table 5.

TABLE 5

Deodorization effect for trimethylamine gas

|  | time (min) | | | |
|---|---|---|---|---|
| Samples | 5 | 15 | 30 | 60 |
| Blank | 0 | 23.5 | 29.4 | 41.2 |
| city water | 42.2 | 64.7 | 85.3 | 88.2 |
| Alamask | 52.9 | 58.8 | 76.5 | 79.4 |
| KW sterilization water | 76.5 | 82.4 | 86.5 | 91.2 |
| processed water | 94.1 | 97.1< | 97.1< | 97.1< |

Deodorization power (%) = [(Cb − Cs/Cb] × 100,
where Cb: concentration checked after 5 minutes of Blank
Cs: concentration of samples Test 3

3 litters of mixture of ammonia and acetic acid gases was supplied into a box having 5 litters of volume prior to adding the finally processed water of this invention into the box. The concentration of water is repeatedly and timely checked for 2–28 hours. In accordance with this test, it is noted that either of the ammonia or acetic acid gas is not detected after twenty two hours of testing as shown in the table 6.

TABLE 6 deodorization effect (ppm) for ammonia or acetic
acid gas

| time (hrs) | ammonia gas (ppm) | acetic acid gas (ppm) |
|---|---|---|
| 2 | 40 | 100 |
| 4 | 4 | 5 |
| 6 | 3 | 3 |
| 8 | 2 | 3 |
| 10 | 2 | 2 |
| 12 | 2 | 2 |
| 14 | 1 | 1 |
| 16 | 1 | 1 |
| 18 | 1 | 1 |
| 20 | 1 | 1 |
| 22 | 0 | 0 |
| 24 | 0 | 0 |
| 26 | 0 | 0 |
| 28 | 0 | 0 |

Test 4

The finally processed water of example 1 was sprayed on an organic fertilizer produced by a fertilizer plant while repeatedly measuring the strength of smell at a point spaced from said plant by 100 m. The results are given as in table 7. In such a case, the strengths of smell are classified into six steps.

TABLE 7 deodorization effect of processed water for
organic fertilizer

| panels | strength of smell before spraying[1] | strength of smell after 5 min of spraying[1] |
|---|---|---|
| 1 | 5 | 0 |
| 2 | 4 | 0 |
| 3 | 4 | 0 |
| 4 | 5 | 1 |
| 5 | 5 | 0 |
| 6 | 5 | 0 |
| 7 | 5 | 1 |
| average | 5 | 0 | strengths of smell:
0: odor-free
1: almost negligible
2: slight smell
3: easy detectible smell
4: slight strong smell
5: very strong smell In addition, it is noted that the deodorization effect of the processed water of this invention is maximized when the water is used while being brought into contact with liquid to liquid to gas or liquid to solid.

Test 5

The washing effect of the processed water, produced by the electrolyzer of this invention, was measured. The laundries of this test were dirty fabrics which individually have a size (1×1 $m^2$), designed reflection factor (80%) and dirty reflection factor (0±0%) in accordance with the requirement of KS (Korean Standard). The dirty fabrics were washed in a washer filled with processed water of this invention without adding any detergent. In order to compare the washing effect of the processed water of this invention to that of general water, such dirty fabrics were also washed in a washer (Model: DWF of DaeWoo Electronic Co. of Korea) filled with 37 litters of underground water (hardness : 45 PPM as $CaCO_3$) added with 23 g of synthetic detergent ("Hanspoon" of LG Chemical Co. of Korea) while heating the washing water to 44° C. The results are given as shown in table 8.

TABLE 8 washing effect of processed water of this invention free from detergent and general water added with detergent

| Ex. laundry | refl'n factor before washing | | avg. | refl'n factor after washing | | avg. | degree of det*(%) |
|---|---|---|---|---|---|---|---|
| 1-1 fabric* | 40.6 | 39.7 | 40.1 | 51.2 | 49.6 | 50.4 | 25.8 |
| 1-2 fabric* | 40.6 | 39.4 | 39.7 | 51.7 | 51.6 | 51.6 | 29.5 |
| avg. standard deviation 1.9 | 40.2 | 39.5 | 39.8 | 51.4 | 50.5 | 51.0 | 27.9 |
| 2-1 fabric* | 39.7 | 39.2 | 39.4 | 54.6 | 53.0 | 53.8 | 35.5 |
| 2-2 fabric* | 40.1 | 39.4 | 39.8 | 50.8 | 51.3 | 51.0 | 27.9 |
| avg. standard deviation 7.4 | 40.1 | 39.4 | 39.8 | 50.8 | 51.3 | 51.0 | 27.9 | fabric*: dirty fabric
det*: detergency
example Nos. 1-1 and 1-2 are washing tests with processed water of this invention free from any detergent, while example Nos. 2-1 and 2-2 are washing tests with underground water added with detergent.

As shown in the table 8 of the washing test, the processed water of this invention effectively and cleanly washes fabrics or clothes even when the washing is performed without adding any detergent into washing water. That is, the washing effect of the processed water of this invention without being added with any detergent is not lower than that expected by general water added with detergent. Furthermore, the average standard deviation of the processed water of this invention is remarkably lower than that of general water as shown in the table 8 so that the processed water of this invention more effectively washes dirty fabrics or clothes than general water added with detergent.

As described above, the present invention provides an apparatus and method of producing water for deodorization and cleaning applications. The apparatus and method of this invention effectively produces acidic and alkaline water through an electroanalysis. Such acidic and alkaline water of this invention is effectively used for deodorization and cleaning applications. The acidic and alkaline water of this invention is used for washing dirty clothes or fabrics without being added with any detergent so that the water is free from causing environmental pollution. The apparatus of this invention is small-sized so that it is effectively used with a washer, a bath tub, a refrigerator, a water purifier or a smell causing place. Therefore, the apparatus and method of this invention does not need any large-sized equipment or cause any secondary environmental pollution, thus doing much for solving the environmental pollution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for producing water for deodorization and cleaning applications, comprising:

an electrolyzer including:

a plurality of anode and cathode units alternately arranged while being brought into close contact with each other, said anode and cathode units being separated from each other by a plurality of ion exchange membranes and individually forming a unit cell; and inlet and outlet end plates attached to both ends of said electrolyzer, said inlet end plate having first and second water inlets, and said outlet end plate having first and second water outlets;

each of said anode units comprising an anode plate sided with a first gap adjusting gasket and a first electrolyte leakage prevention gasket at its both sides, thus forming an anode reaction chamber, and each of said cathode units comprises a cathode plate sided with a second gap adjusting gasket and a second electrolyte leakage prevention gasket at its both sides, thus forming a cathode reaction chamber.

2. The apparatus according to claim 1, wherein each of said gaskets of the anode and cathode units has two passages at diagonally opposite positions, thus allowing water from said first inlet of the inlet end plate to be exclusively introduced into the anode reaction chambers and allowing water from said second inlet to be exclusively introduced into the cathode reaction chambers.

3. The apparatus according to claim 1, wherein a numerical stabilizing anode (DSA), made of a titanium substrate plated with platinum or coated with an oxygen generating catalyst, is used as each of said anode plates.

4. The apparatus according to claim 1, wherein a stainless steel, nickel, mild steel or titanium substrate, coated with a hydrogen generating catalyst, is used as each of said cathode plates.

5. The apparatus according to claim 3, wherein said oxygen or hydrogen generating catalyst is selected from iridium (Ir) and ruthenium (Ru).

6. The apparatus according to claim 4, wherein said oxygen or hydrogen generating catalyst is selected from iridium (Ir) and ruthenium (Ru).

* * * * *